US007164220B2

(12) United States Patent
Gilmour et al.

(10) Patent No.: US 7,164,220 B2
(45) Date of Patent: Jan. 16, 2007

(54) STATOR POLE STRUCTURE FOR AN ELECTRICAL MACHINE

(75) Inventors: Kenneth S Gilmour, Nottingham (GB); Timothy M S Myers, Newcastle upon Tyne (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/127,104

(22) Filed: May 12, 2005

(65) Prior Publication Data

US 2005/0212381 A1 Sep. 29, 2005

Related U.S. Application Data

(63) Continuation of application No. PCT/GB03/05010, filed on Nov. 17, 2003.

(30) Foreign Application Priority Data

Dec. 7, 2002 (GB) ................................ 0228642.5

(51) Int. Cl.
*H02K 1/22* (2006.01)
*H02K 1/00* (2006.01)

(52) U.S. Cl. ....................... 310/266; 310/216; 310/254

(58) Field of Classification Search ................ 310/254, 310/258, 259, 65, 266, 156.02, 257, 164
See application file for complete search history.

(56) References Cited

U.S. PATENT DOCUMENTS

| | | | | |
|---|---|---|---|---|
| 3,235,761 | A * | 2/1966 | Nohen | 310/172 |
| 3,809,938 | A * | 5/1974 | Sjoberg et al. | 310/254 |
| 3,919,348 | A * | 11/1975 | Foster et al. | 336/219 |
| 4,672,252 | A * | 6/1987 | Spirk | 310/216 |
| 6,448,685 | B1 | 9/2002 | Mayer | |
| 6,879,079 | B1 * | 4/2005 | Vollmer | 310/254 |
| 2002/0047458 | A1 * | 4/2002 | Kliman et al. | 310/215 |
| 2002/0105245 | A1 | 8/2002 | Park | |
| 2002/0113520 | A1 | 8/2002 | Kastinger | |
| 2002/0190601 | A1 * | 12/2002 | Horng et al. | 310/254 |
| 2003/0193264 | A1 * | 10/2003 | Pyntikov et al. | 310/254 |
| 2005/0204545 | A1 * | 9/2005 | Gieras et al. | 29/596 |

FOREIGN PATENT DOCUMENTS

| | | |
|---|---|---|
| DE | 195 47 159 A | 6/1996 |
| FR | 2 807 885 A | 10/2001 |
| GB | 2 139 822 A | 11/1984 |

* cited by examiner

*Primary Examiner*—Karl Tamai
*Assistant Examiner*—Erik Preston
(74) *Attorney, Agent, or Firm*—W. Warren Taltavull; Manelli Denison & Selter PLLC

(57) ABSTRACT

An electrical machine, such as a transverse flux motor, incorporates a stator core assembly 1. The stator core assembly 1 comprises a stator frame 4 upon which stator cores 2,3 are located with spacer elements 7 therebetween. A number of stator pole members 10,11 are located such that channels 13 in these members 10,11 accommodate limbs 5,6 of the cores 2,3. The stator pole members 10,11 straddle more than two limbs 5,6 in order to provide greater structural stability for the assembly 1 despite magnetic flux cycling and other distortion effects. By such greater structural stability more accurate control of a gap between the stator core assembly 1 and a rotor in the machine can be maintained.

23 Claims, 2 Drawing Sheets

STATOR POLE STRUCTURE FOR AN ELECTRICAL MACHINE

This application is a continuation of PCT/GB2003/005010 filed Nov. 17, 2003, the priority of which is claimed.

FIELD OF THE INVENTION

The present invention relates to an electrical machine and more particularly to a transverse flux motor including a stator assembly and a rotor.

BACKGROUND OF THE INVENTION

It is known to provide electrical machines which comprise a stator assembly formed from laminations of appropriate material in order to create poles which magnetically interengage with a rotor. The electrical machine constitutes a motor driven by magnetic engagement between the stator assembly and the rotor. Typically, the stator is appropriately constructed in order to comprise a succession of electromagnets whose pole characteristics can be alternated in order to drive the rotor, which in this case incorporates permanent magnets.

The stator assembly typically comprises a number of C shaped stator cores assembled in a circular hub with the rotor passing through the open jaw of each C shaped stator core. Typically, the C shaped cores are manufactured by winding a strip of grain oriented electrical steel around a former and then impregnating with an adhesive and curing. The open jaw is subsequently created by machining in order to make the correct shape of material in the region of the tips (also known as stator poles).

It will be understood that it is the tips of these jaws which transmit the rotational torque forces to the stator and also experience jaw closing forces due to the magnets in the rotor. In operation, these forces are cyclical, but the closing force component is also present when the machine is stationary. Thus, the tips tend to move in operation and the whole C core is subject to vibration and can generate excessive audible noise. The vibration can also cause delaminations of the wound lamination material in the region of the tips. The individual laminations lack strength and can be pulled into contact with the rotor by the magnetic forces. Also, even when stationary, the C cores as a whole experience the closing force which over time causes creepage of the bonding adhesive leading to closure of the tips onto the rotor even if vibration induced delamination has not occurred.

SUMMARY OF THE INVENTION

In accordance with the present invention, there is provided an electrical machine comprising a stator and a rotor, the stator including stator core members spaced relative to one another and at least one stator pole member configured by itself or with other members to straddle two or more stator core members to provide structural stability.

Also in accordance with the present invention there is provided a stator pole member for an electrical machine including stator core members, the pole member being arranged by itself or with other pole members in use to straddle two or more stator core members to provide structural stability.

Preferably, each stator pole member includes channel pockets within which at least a portion of each stator core member straddled by the pole member is located.

Preferably, in accordance with the invention, each stator pole member is arranged to form an interlocking arch or ring about the stator core members. Normally, pole members will be arranged to form concentric inner and outer pole member combinations for respective opposed portions or limbs of the stator core members. Possibly, the stator pole members form a part circle or are arranged linearly in order to form an actuator.

Preferably, spacer members are provided between adjacent stator core members. Normally, the spacer members provide further structural reinforcement for a stator assembly. Advantageously, clamping means is provided to force the stator core members and/or the spacing elements inwards in order to resiliently clamp the stator cores together in the stator assembly.

Normally, the stator assembly includes a stator frame upon which the stator core members are mounted along with the stator pole members and, where provided, the spacer elements. Typically, locking pins are provided to extend through the stator core members and/or stator pole members and/or spacer elements into engagement with the stator frame to stabilise location of these components within the stator assembly.

Generally, electrical insulation is provided between the stator pole members and/or the stator core members.

Advantageously, the stator core members and the stator pole members and, where provided, the spacer elements are embedded and/or potted and/or bonded together using an adhesive material. Typically, that adhesive material is a hot curing epoxy resin adhesive.

Preferably, the pole members are shaped to facilitate air flow cooling when installed within the electrical machine. Typically, the shaping is rebated flutes provided about either side of stator tips upon the open surface of the stator pole members.

Interconnecting, or intersecting grooves can be provided in the spacers and pole tip arcs which in turn intersect radial holes in the stator frame. These holes and grooves can form passageways for cooling air flow, directing it onto the sides of the C-cores, and/or allowing flow, around the coil and/or directing flow onto the rotor rim. The "flutes" could be filled with inert material to ensure that air flow around the rim does not bypass the rim. Exactly which combination is used depends on what the thermal management approach is for a given machine. The "standard" design relies on water-cooling of the C-cores and tips by conduction to the stator frame, with the rotor rim being air cooled. The coil is part water, part air cooled. In this arrangement it is desirable to insulate the cores/pole tips as far as possible from the air flow (so as not to preheat the air and prevent it cooling the parts it is intended to cool). A predominantly air-cooled machine design would maximise air contact with the stator components. The options exist for either approach, or intermediate approaches.

Normally, the stator core members are laminated. Preferably, the stator pole members are laminated.

Advantageously, there is key interlocking between adjacent opposed surfaces of the pole members with electrical insulation therebetween.

Preferably, the stator pole members are laminated in a different plane to the stator core members.

Typically, the stator core members are made from stacks of flat laminations of magnetic grain orientated material.

Preferably, the stator pole members are made from stacks of flat laminations of magnetic non-grain orientated material.

Further in accordance with the present invention, there is provided a method of making an electrical machine including the steps of forming a number of stator core members by laminating flat laminations of material, securing those stator core members upon a stator frame, forming at least one stator pole member of the electrical machine by laminating a number of flat laminations and location of each pole member to straddle at least two stator core members to provide a structurally reinforced stator assembly.

Alternatively, the stator core members and/or the pole members will be cut to the desired shape from a laminate block. Alternatively, prior to lamination each flat lamination of the stator core members and/or the pole members is cut or punched to the desired shape and assembled in a jig.

Advantageously, the method will also include the step of embedding or potting the stator core members and pole members and, where provided, the spacer elements in an adhesive.

An embodiment of the present invention will now be described by way of example only with reference to the accompanying drawings in which;

DETAILED DESCRIPTION OF THE INVENTION

A motor operating upon transverse flux principles consists of a stator winding in the form of a circular coil co-axial with a rotor. The stator links the magnetic flux generated by permanent magnets mounted on the rim of a rotor disc through a series of stator cores. These stator cores are spaced about the rotor path. The stator cores are typically laminated assemblies of grain orientated material shaped in order to provide the desired stator core to rotor magnetic interaction. Normally, a rotor rim and co-operating stator core and stator coil assembly are located on either side of the rotor disc in order to provide greater torque potential. Additionally, more concentric rims may be located on each side of the rotor disc at different diameters, each with its own co-operating ring of stator cores and stator coil for greater torque potential.

In order to achieve high electrical machine power density it is desired to maximise magnetic flux interaction. In such circumstances, the rotor and the stator assemblies are arranged such that as small a gap as possible is provided between the rotor and the stator tip surface. Unfortunately, as indicated above, previous stator assemblies are susceptible to de-lamination and distortion such that the gap will close with a resultant clash between the rotor and the stator assembly surfaces. Furthermore, any movement within the stator core assembly may result in vibration and high audible noise.

Figure 1:
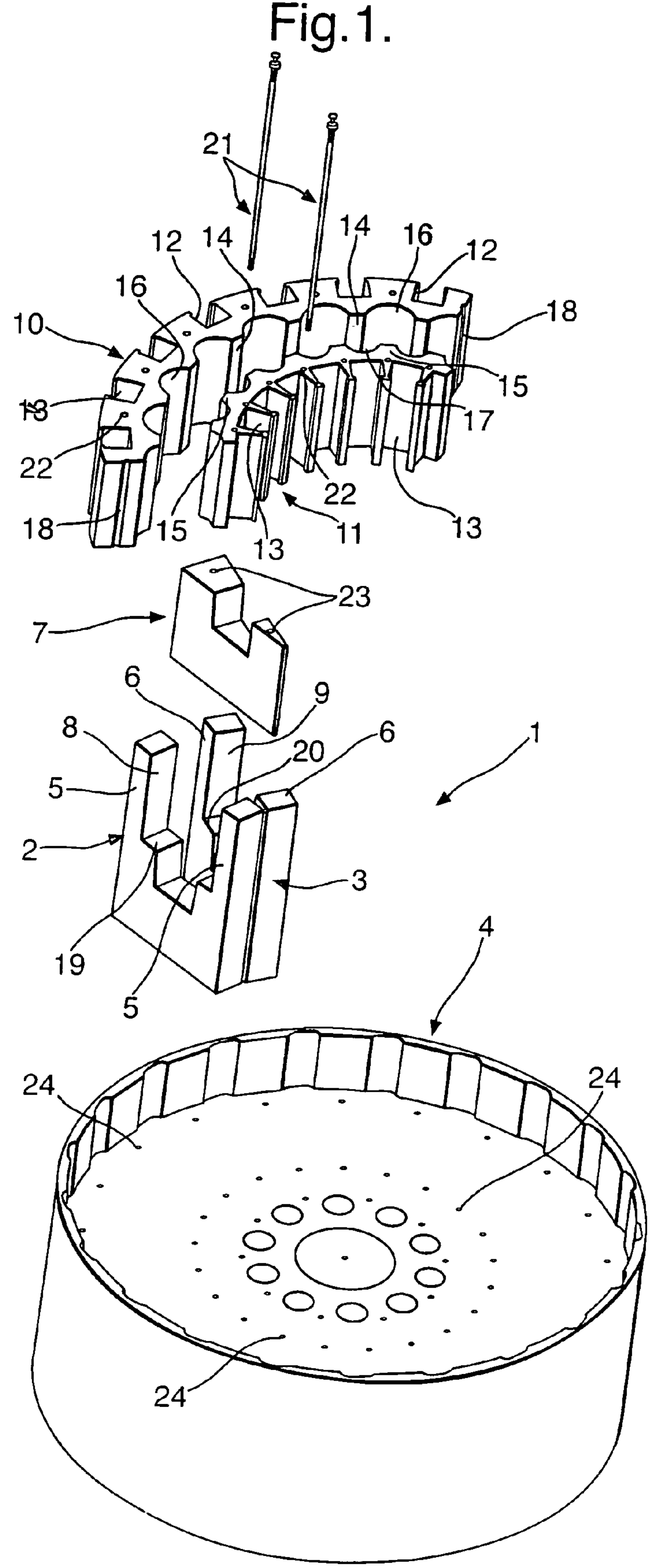
FIG. 1 is an exploded front perspective view of one stator of an electrical machine assembly in accordance with the invention; and, FIG. 2 is a front perspective of one stator assembly of an electrical machine in accordance with the present invention.

FIG. 1 illustrates an exploded front perspective of a stator core assembly 1 which forms part of an electrical machine. For clarity, only a pair of stator cores 2,3 are illustrated but it will be appreciated that such cores 2,3 will be located at appropriate spacing about the whole circumference of a stator core frame 4. The stator cores 2,3 have a general C shaped configuration such that a rotor will pass between an open jaw created by limbs 5,6. Normally, within a stator core assembly 1, spacer elements 7 are provided to separate each stator core 2,3 and allow the stator core assembly 1 to be held in a robust association.

During operation in an electrical machine, such as a transverse flux motor, each stator core 2,3 will be energised appropriately to create adjacent magnetic pole inversion across opposed respective limbs 5,6 in order to drive the rotor (not shown) between the open jaw created by those limbs 5,6.

Normally, a stator core assembly 1 will be provided on either side of the rotor.

The magnetic flux interface with the rotor is made through respective core interface surfaces 8,9 in respective limbs 5,6. Thus, with a previous stator core (not illustrated) where the stator tips are formed by machining the wound core, it is essential that the stator cores are accurately formed. A higher manufacturing accuracy allows specification of as narrower a gap between those interface surfaces 8,9 and the rotor as possible for good magnetic flux interface and so electrical machine power density. During operation there are high magnetic fluxes presented through the cores 5,6, as well as cycling of those fluxes, such that over a period of time it is possible or even probable that there will be step slide/fracture, creep or de-lamination between the wound lamination strip from which each core 2,3 is formed. In such circumstances, the gap between the rotor and the interface surfaces 8,9 will vary or even close causing the electrical machine to fail. In any event, the electrical machine will become more noisy due to vibration etc.

In accordance with the present invention stator pole members 10,11 are provided. These stator pole members 10,11 include pocket channels or slots 12,13 within which the limbs 5,6 of each stator core 2,3 are located. These stator pole members 10,11 act as a magnetic flux matrix through which the magnetic flux from the stator cores 2,3 act and additionally reinforce the structural stability of the stator core assembly 1 by effectively confining the limbs 5,6 to within the channels or slots 12,13. The materials from which the stator pole members 10,11 are formed are electrically conductive and so it is necessary to provide electrical insulation or controlled clearance between the limbs 5,6 and the pole members 10,11, which is located between surfaces 8,9 and the mating surface in channels or slots 12,13.

Each stator pole member 10,11 includes respective stator tip or interface areas 14,15 through which there is magnetic flux interface with a rotor (not shown) which passes between the members 10,11. Fluting or channels 16,17 are primarily provided between these stator tip or interface areas 14,15 to facilitate magnetic interaction but also provide cooling by air circulation and flow. The shaping of the whole interface surface comprising tips 14,15 and channels 16,17 is designed and specified for best interaction with the rotor and in particular magnets located in that rotor for electrical machine efficiency and operation. It will be noted that the tips or areas 14,15 are generally the same width as the rotor poles so that they do not overlap between rotor poles and so short out magnetic North and South poles. Furthermore, these areas are also displaced circumferentially (interdigitated) such that they co-operate with opposite polarity poles on the rotor rim.

Normally, each stator pole member 10,11 will straddle at least two stator cores 2,3 in order to provide reinforcement and structural stability. The whole stator core assembly 1 will include sufficient stator pole members 10,11 to provide concentric rings of stator pole members 10,11 about the inner and outer sides of the stator core assembly. Each stator pole member 10,11 will include an interface with its adjacent members 10,11. This interface may comprise a mechanical connection which extends across interlock channels 18 at each end of the member 10 or a surface-to-surface abutment with electrical insulation between adjacent members 10,11. In any event, the combined stator pole members form a solid ring or arch which straddles the limbs 5,6 of the stator cores 2,3 for structural stability and magnetic flux interaction.

Each spacer element 7 will generally act upon a lower part of each stator core 2,3. In FIG. 1 each element 7 acts up to a shoulder or step 19,20. The stator pole members 10,11 will then sit upon these shoulders 19,20 and surfaces 25,26 on element 7 in order to provide the necessary reinforcement for structural stability and magnetic interface about the magnetic interface areas 14,15.

In use the whole stator core assembly 1 is locked in place through bolts 21 which extend through holes 22 in the members 10,11, holes 23 in the spacer elements 7 and holes 24 in the stator frame 4. The whole stator core assembly 1 is thus generally robust and structurally stable. Normally, a high temperature curing epoxy resin adhesive is also provided to embed the limbs 5,6 within the channels 13 of the stator pole members 10,11. Such resin may also be used at other juxtaposed surfaces within the stator core assembly 1 in order to further strengthen that assembly 1. Generally the whole assembly 1 will be cured for a suitable period of time at a high temperature.

Figure 2:
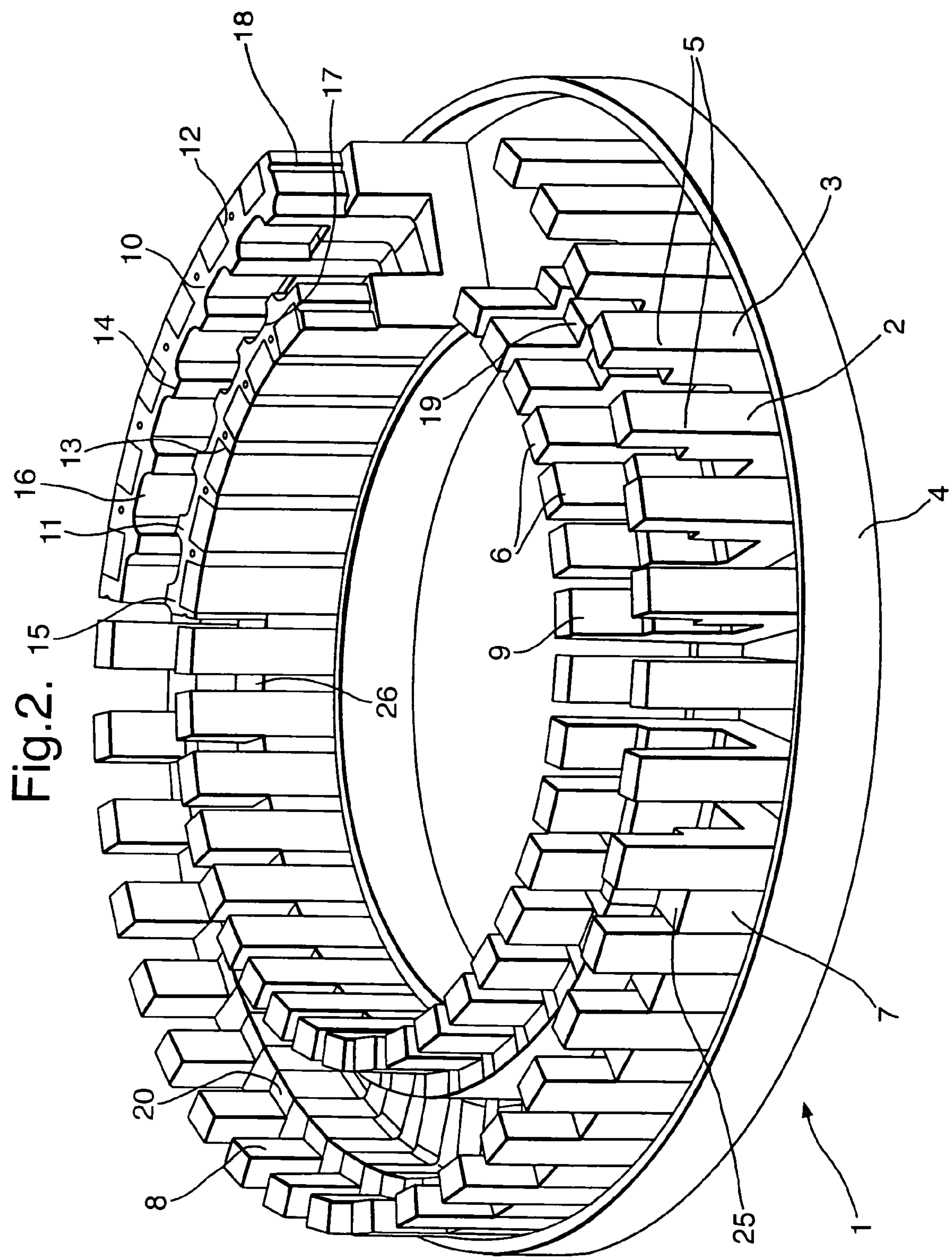

FIG. 2 shows a stator core assembly 1 similar to that depicted in FIG. 1 so that similar reference numerals have been provided. FIG. 2 shows the various stages of construction with a portion of unpopulated stator, then cores only, then cores and spacers and finally cores, spacers and pole tip arcs. Thus, a stator frame 4 provides a base upon which stator cores 2,3 are located with spacer elements 7 between these cores 2,3. Only one outer stator pole member 10 and one inner stator pole member 11 are shown assembled in FIG. 2 but it will be appreciated that similar members 10,11 will be located about each concentric circular ring of limbs 5,6 of the stator core members 2,3. As indicated previously, all of the components will be secured together with locating pins or bolts through appropriate holes in the components as described previously.

The stator frame 4 will generally be manufactured from aluminium and provide a robust base possibly water cooled on which the stator core assembly 1 can be formed.

The spacer elements 7 act between the stator cores 2,3. In such circumstances, the spacer elements 7 will be formed from solid material resistant to deformation and distortion. The upstanding limbs 5,6 in the configuration of the figures are relatively free and so able to distort unless reinforced by the present stator pole members 10,11. Such a robust assembly 1 ensures that de-lamination and any distortion effects such as creep under the influence of magnetic closing forces is resisted by the enhanced structural stability of the assembly 1.

In accordance with the present invention the stator cores 2, 3 are formed separately from the stator pole members 10,11. However, both the cores 2, 3 and the pole members 10, 11 are provided by bonded laminations. The cores 2, 3 comprise bonded laminations as indicated previously which are generally of a C shape more clearly depicted in FIG. 1. These C shaped flat laminations are secured as indicated in the Figs. in an upright position normal to the rotor rim surface i.e. aligned with radial lines projected from the machine axis. The assembly 1 in an electrical machine may present the cores 2, 3 at different angles to the rotor rim i.e. skewed in relation to radial lines projected from the machine axis dependant upon machine orientation. The stator pole members 10, 11 are also formed from flat laminations which are cut or pressed with the channels or slots 12, 13 and magnetic interface tips 14, 15. The laminations also include interlock features 18 as depicted in FIG. 1 for assembly of the members 10,11 together.

The laminations of stator pole members 10, 11 are stacked one upon the other and as can be seen will generally extend laterally or horizontally. Thus, in the stator core assembly 1 the laminations of the stator cores 2, 3 are principally in a vertical configuration as compared with the laminations of the stator pole members 10,11 which extend in a horizontal plane. Such arrangement will generally improve structural stability as well as magnetic engagement with the rotor. The lamination direction is appropriate to the direction of the magnetic flux in these components. The flux goes around the C-cores so "vertical" laminations give a continuous metal pathway without the flux having to cross between laminations. In the stator pole members the flux direction is turned to become "horizontal" as it enters/leaves the rotor. In the air gap region the flux plane is basically horizontal, and so these components are laminated horizontally. Electrical insulation is provided between the pole members 10,11 and contacting surfaces of the cores 2, 3. As the pole members 10,11 straddle generally more than two cores 2, 3 the whole assembly 1 is stabilised.

Normally the cores 2, 3 and the stator pole members 10,11 are manufactured from different magnetic materials and as indicated previously bonded together as stacks of flat laminations cut or pressed to the desired shape. The number of cores 2, 3 is generally determined by desired electrical machine performance in terms of size and torque or generation efficiency and is generally equal to, but not tied to the pole member of the machine.

The number of stator pole members 10, 11 provided within an assembly 1 is determined by a number of manufacturing factors. It is necessary to accurately produce initially the laminations which form the members 10, 11 and then accurately assemble those laminations to a high tolerance level to ensure accuracy with respect to the eventual gap between the tips or interengagement areas 14, 15 and the rotor. The number of stator pole tips in the complete ring of stator pole members is equal to the pole number of the machine.

It is possible to manufacture a single stator pole member which extends around the assembly. However, a discontinuity or gap is required to prevent electrical conduction around the member and this could be created by overlapping laminations whilst maintaining the essential mechanical properties of the ring.

Normally, several stator pole members 10, 11 will be provided as shown in order to create the complete stator pole member arch or ring. Similarly, a number of stator pole members could be manufactured, possibly with one member for each limb 5,6, and these individual stator pole members secured together by an appropriate method in order just to create a sub-assembly stator pole member which is then interlocked with similar sub-assembly stator pole members in order to create the arch or ring of the assembly 1. However, with such an approach it will be appreciated that the method of securing together the individual stator pole members in order to create the sub assembly which straddles two or more limbs 5, 6 may itself be susceptible to creep or other distortion so that it is preferred that each stator pole member in itself straddles two or more limbs and is sufficiently robust for purpose in terms of lamination strength over a number of stator cores 2, 3.

Alternatively, single pole pieces bonded to limbs 5, 6 could be provided with insulating packing between pole pieces which also holds them in place mechanically. However, this approach is subject to bond failure with resultant pole piece detachment. Thus, it is preferred to provide members 10, 11 which are mechanically fixed in place to ensure that they cannot detach individually. The "length" of members 10,11 or number of cores 2,3 spanned is intended to be as large as it is possible to economically make, as this increases the machine strength.

In accordance with the present invention the lamination direction chosen for the stator cores is such that, combined with the stator pole members, the assembly is stiffer in a closing sense compared to previous stator core assemblies. There is a resistance to magnetic closing forces and this diminishes or eliminates creep problems with respect to distortion of the gap between the rotor and magnetic interface of the stator core/stator pole member.

The stator pole members are laminated as indicated above in a plane consistent with that of the rotor. Such lamination will minimise electrical eddy current losses in the tip or magnetic interface area. The plane of the stator pole member is different from that of the stator cores which are laminated in the plane of the electrical machine. An advantage with separate stator pole members is the facility to use different magnetic materials in the stator cores and stator pole members. Each material can be optimised for its particular necessary characteristic as a stator core or as a stator pole member.

The stator pole members as indicated above are bolted in regions between each tip or magnetic interface area to ensure resilient location and prevent detachment in service. The chosen locations are intended to cause minimum disruption to the flux paths through the material.

As indicated above, it is advantageous to provide multiple stator pole members in order to create arches or rings. Such stator pole members can be more accurately made and so allow better regulation of the gap between the rotor and the tip or interface surfaces to be achieved. These pole members can be significantly more accurately made than the stator cores and in particular are more accurate than those cores when located upon the stator frame. In effect, the limbs of the stator cores can be slightly mis-aligned within the channel or slots of the stator pole members whilst the tips or interface areas are accurately located.

One of each set of spacers and stator pole members is a "special", having orientation/location features which fix the circumferential position of the stator pole faces. Thus, one spacer is accurately located circumferentially with the spacer frame and the cores and other spacers are located relative to it. Similarly, one stator pole member (which is mounted on top of the "special" spacer) picks up the orientation feature and then locates the other stator pole members. Thus, the circumferential location of the pole member tip faces is fixed in relation to the stator frame (4). This is important to ensure accurate machine phasing, as each rim/stator represents one electrical phase of the overall machine.

Laminated stator cores and stator pole members provide greater dimensional accuracy in the plane of the lamination in comparison with earlier wound stator cores. Furthermore, use of flat laminations avoids built-in stresses associated with winding a core from strips of material. It will be understood that by winding there is an in-built stress or bias towards delamination in the event of bond weakness through creep or magnetic flux stresses.

The spacer elements as indicated above are generally solid blocking pieces which form a solid arch bound ring with the stator cores in order to create a stiffer assembly with enhanced acoustic noise reduction benefits.

The stator frame and spacer elements will normally be formed from aluminium which is in good intimate thermal contact with the stator pole members and stator cores in order to achieve a good thermal pathway for cooling of the stator core assembly as part of an operational electrical machine.

During manufacture the stator cores as indicated previously are created from stacks of pre-shaped laminations. These laminations are clamped together and bonded appropriately into a single laminated structure. Alternatively, a block of laminated material may be manufactured and then the stator cores cut to shape by wire erosion, water jetting or other means. Generally, the stator cores are manufactured from electromagnetic material which is grain orientated in the direction of the limbs.

Similarly, the stator pole members are manufactured from stamped or cut laminations of flat material, clamped as appropriate in a jig and bonded together to provide the appropriate structure. Normally, the stator pole members are made from non-grain orientated electromagnetic material.

Normally, the spacer elements are configured upon jacking screws such that these elements are forced radially inwards in order to provide a clamping action for location and assembly of the stator cores upon the stator frame. Once approximately adjusted by varying the jacking screws clamping action, the stator pole members are added and a measuring gauge is used to ensure correct stator pole tip location before final locking of the assembly. As indicated previously, in accordance with the present invention, the necessary positional accuracy for the stator cores may be less than previously provided the stator core limbs can be located within the channel pockets of the stator pole members. During assembly, a thin layer of electrical insulating material is placed between the stator pole members and opposed surfaces of the stator core. Insulated lock down bolts are then passed through the stator pole members and spacer elements in order to engage threaded holes in the stator frame. These bolts serve to hold down the entire stator core assembly to the stator frame. Finally, the components of the stator core assembly are coated with a hot curing epoxy resin and the jacking screws and hold down bolts are finally adjusted for correct alignment and location. Normally, the entire core assembly is often cured for appropriate resilient combination and possibly stress relief.

The stator pole members are accurately made, and will be used to locate the cores before the jacking screws are finally locked up. The order of assembly will therefore be: insert C-cores and spacers. Approximately adjust. Place stator pole members over the C-cores. Check stator pole member pole tip faces with a measuring gauge. Clamp up the jacking screws when correct.

It will be appreciated that the stator pole members in accordance with the present invention may not be locked down by bolts as described previously. Thus, the interlock nature between adjacent stator pole members and possibly adhesion between the stator pole members and the limbs of the stator cores will be utilised in order to provide appropriate stability. However, it will be appreciated that with such an arrangement there is a risk of detachment and/or movement over and above that of the preferred assembly where hold down bolts are provided.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A stator pole member for an electric machine including stator core members, characterized in that the stator pole member is arranged in use to straddle more than two stator core members to provide structural stability wherein the stator pole member is arranged with other stator pole members to form concentric inner and outer pole member combinations for respective opposed limbs of the stator core members.

2. A stator pole member as claimed in claim 1 characterised in that said stator pole member includes channels or slots within which at least a portion of each stator core member straddled by the pole member is located.

3. A stator pole member as claimed in claim 1 characterised in that each stator pole member is arranged with other stator pole members to form an inter locking arch or ring about the stator core members.

4. An electrical machine comprising a stator and a rotor, the stator including stator core members spaced relative to one another characterized in that at least one stator pole member is configured to straddle more than two stator core members to provide structural stability wherein electrical insulation is provided between each stator pole member and the stator core members.

5. An electrical machine as claimed in claim 4 characterised in that spacer elements are provided between adjacent stator core members.

6. An electrical machine as claimed in claim 5 characterised in that the spacer elements provide further structural reinforcement for a stator assembly including stator cores.

7. An electrical machine as claimed in claim 6 characterized in that the stator assembly includes a stator frame upon which the stator core members are mounted along with each stator pole member and the spacer elements.

8. An electrical machine as claimed in claim 7 characterized in that locking pins are provided to extend through the stator core members and/or each stator pole member and/or spacer elements into engagement with the stator frame to stabilize location of those components with the in the stator assembly.

9. An electrical machine as claimed in claim 5 characterized in that the spacer members are shaped to facilitate airflow cooling when installed within the machine.

10. An electrical machine as claimed in claim 9 characterized in that the spacer members are shaped by providing fins for improved heat transfer.

11. An electrical machine as claimed in claim 5 characterised in that clamping means is provided to force that stator core members, and the spacer elements inwards in order to resiliently clamp the stator core members together in the machine.

12. An electrical machine as claimed in claim 4 characterised in that the stator core members and the stator pole members are embedded in an adhesive material.

13. An electrical machine as claimed in claim 12 characterized in that the adhesive material is a hot curing epoxy resin adhesive.

14. An electrical machine as claimed in claim 4 characterized in that each stator pole member is shaped to facilitate airflow cooling when installed within the electrical machine.

15. An electrical machine as claimed in claim 14 characterized in that the stator poll members are shaped with a rebated flute provided about either side of tips upon a surface of each stator pole member for magnetic interface with the rotor.

16. An electrical machine as claimed in claim 4 characterized in that the stator core members are laminated structures formed from shaped flat laminations of suitable electro-magnetic material.

17. An electrical machine as claimed in claim 16 characterized in that each stator pole member is laminated in a different plane to the stator core members when assembled within the machine.

18. An electrical machine as claimed in claim 16 characterized in that the stator core member is made from stacks of flat laminations of magnetic grain oriented material.

19. An electrical machine as claimed in claim 4 characterized in that each stator pole member is a laminated structure formed from shaped flat laminations of suitable magnetic material.

20. An electrical machine as claimed in claim 19 characterized in that each stator pole member is made from stacks of flat laminations of magnetic non-grain oriented material.

21. An electrical machine comprising a stator and a rotor, the stator including stator core members spaced relative to one another characterized in that at least one stator pole member is configured by itself or with other stator pole members to straddle two or more stator core members to provide structural stability wherein the stator pole members are arranged to form concentric inner and outer pole member combinations for respective opposed limbs of the stator core members.

22. An electrical machine comprising a stator and a rotor, the stator including stator core members spaced relative to one another characterized in that at least one stator pole member is configured by itself or with other stator pole members to straddle two or more stator core members to provide structural stability wherein electrical insulation is provided between each stator coat pole member and the stator core members.

23. An electrical machine comprising a stator and a rotor, the stator including stator core members spaced relative to one another characterized in that at least one stator pole member is configured by itself or with other stator pole members to straddle two or more stator core members to provide structural stability wherein spacer elements are provided between adjacent stator core members that are shaped by providing fins for improved heat transfer to facilitate airflow cooling when installed within the machine.

* * * * *